United States Patent [19]

Kaneda et al.

[11] Patent Number: 4,860,190

[45] Date of Patent: Aug. 22, 1989

[54] COMPUTER SYSTEM FOR CONTROLLING VIRTUAL MACHINES

[75] Inventors: Saburo Kaneda, Yokohama; Kazuaki Murakami, Kawasaki, both of Japan

[73] Assignee: Fujitsu Limited, Kawasaki, Japan

[21] Appl. No.: 902,674

[22] Filed: Sep. 2, 1986

[30] Foreign Application Priority Data

Sep. 3, 1985 [JP] Japan .................................. 60-194070

[51] Int. Cl.$^4$ .............................................. G06F 9/46
[52] U.S. Cl. ................................................. 364/200
[58] Field of Search ... 364/200 MS File, 900 MS File

[56] References Cited

U.S. PATENT DOCUMENTS 4,435,755  3/1984  Meritt ................................. 364/200
4,564,903  1/1986  Guyette ............................... 364/300

FOREIGN PATENT DOCUMENTS 0150039  7/1985  European Pat. Off. .

OTHER PUBLICATIONS

Patent Abstracts of Japan, vol. 8, No. 51 (P-259) [1488], Mar. 8, 1984, for JP-A-58 200 363 (Nippon Denki K.K.) 11-21-83.
European Search Report, The Hague, 01-25-88.

*Primary Examiner*—David L. Clark
*Attorney, Agent, or Firm*—Staas & Halsey

[57] ABSTRACT

A computer system for controlling virtual machines each given a different identification number. The system comprises mask registers and I/O interruption queues, each provided with the same numbers as the virtual machines, and corresponding to any one of the identification numbers. An interrupt handling in any one of the virtual machines can be carried out directly by using a pair of corresponding mask registers and I/O interruption queues without an interposition of the VM monitor.

6 Claims, 5 Drawing Sheets

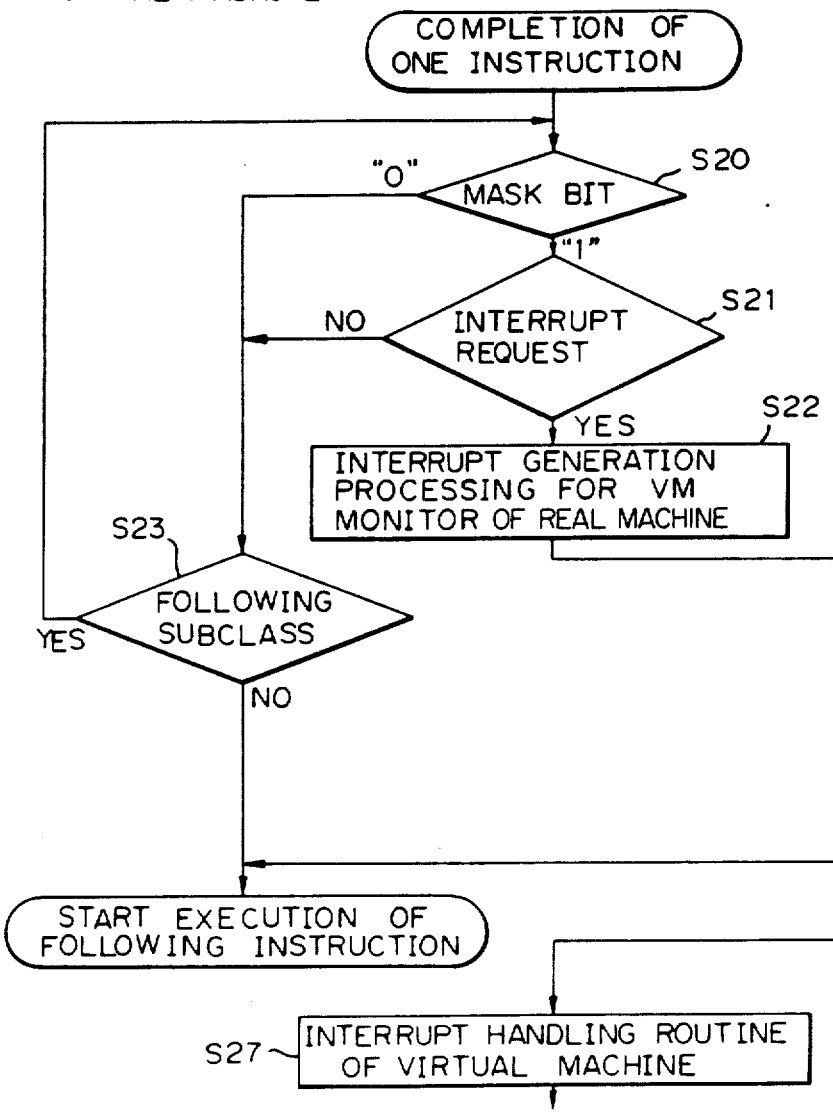

(EXECUTION OF VM MONITOR)

COMPUTER SYSTEM FOR CONTROLLING VIRTUAL MACHINES

BACKGROUND OF THE INVENTION

1. Field of the Invention

The present invention relates to a virtual machine system for controlling multiple virtual machines, in particular, to a system for handling an input/output (I/O) interrupt generated by an I/O device during the operation of a virtual machine.

2. Description of the Related Art

In a computer system, in order to realize the effective use of system resources, it is well known to construct a virtual machine system comprising one or more virtual machines realized by an existing real machine comprising by hardware.

In the virtual machine system, each virtual machine is controlled by a virtual machine control program (hereinafter called the "VM monitor") of a real machine system. Namely, control of a virtual machine, to which the control right over a CPU (central processing unit) has been transferred by the VM monitor, is carried out by the CPU in the real machine.

System control of the virtual machine is carried out by an operating system of the virtual machine. However because such control affects another virtual machines, the efficiency of the entire real machine system is decreased by interposition of the VM monitor, etc.

For example, when the virtual machine instructs an I/O start for an I/O device, if an I/O operation resulting from the I/O start is completed by the I/O device, the I/O device generates an I/O interrupt for the CPU, realized by the interposition of the VM monitor. Namely, when the I/O interrupt is generated by the I/O device during an operation of the virtual machine, if the I/O interrupt is enabled, an interrupt generating process for the real machine is carried out to transfer the control right over the CPU to the VM monitor of the real machine. The VM monitor carries out an interrupt handling routine to analyze the contents of the I/O interrupt, etc. Then, if the virtual machine, which has generated the I/O instruction to cause the I/O interrupt, is in an interrupt enabled state, the VM monitor simulates the generation of the I/O interrupt for the virtual machine to transfer the control right over the CPU to that virtual machine, whereby an interrupt handling routine is carried out in that virtual machine.

As described above, the I/O interrupt in the virtual machine system must be performed with the interposition of the VM monitor, so that time is necessary for the execution of the VM monitor in addition to time for processing a primary task such as interrupt processing. As a result, overhead for controlling the virtual machine is increased, which reduces the processing power of the virtual machine system.

SUMMARY OF THE INVENTION

Therefore, it is an object of the present invention to provide a computer system for controlling virtual machines wherein control overhead is reduced.

In accordance with the present invention, there is provided a computer system for conrolling virtual machines, each machine given a different identification number, comprising: a central processing unit; a channel processor; one or more I/O devices accommodated by the channel processor, each device being given any one of the different identification numbers; mask memories provided with the same numbers as the virtual machines, and each corresponding to any one of the different identification numbers; I/O interruption queues provided with the same numbers as the virtual machines, each corresponding to any one of the different identification numbers; and an identification memory for storing the identification number of a virtual machine currently in operation. An I/O start for the I/O device is carried out by the central processing unit, accompanied with the designation of the identifcation number to which the I/O device in question belongs. The channel processor sets an I/O interrupt request, from the I/O device, into the I/O interrupt queue corresponding to the identification number when the I/O interrupt request occurs. The central processing unit can uses the mask memory indicated by the identification number stored in the identification memory and determines whether or not the interrupt of the I/O device in question is enabled.

BRIEF DESCRIPTION OF THE DRAWINGS

Embodiments of a computer system according to the present invention will now be described with reference to the accompanying drawings, in which:

FIGS. 2A and 2B comprise a flowchart showing an interrupt handling sequence executed in the system shown in FIG. 1;

DESCRIPTION OF THE PREFERRED EMBODIMENTS

For an easy and better understanding of the present invention, a virtual machine system of the prior art and its problems are first described with reference to FIGS. 1 and 2.

Figure 1:
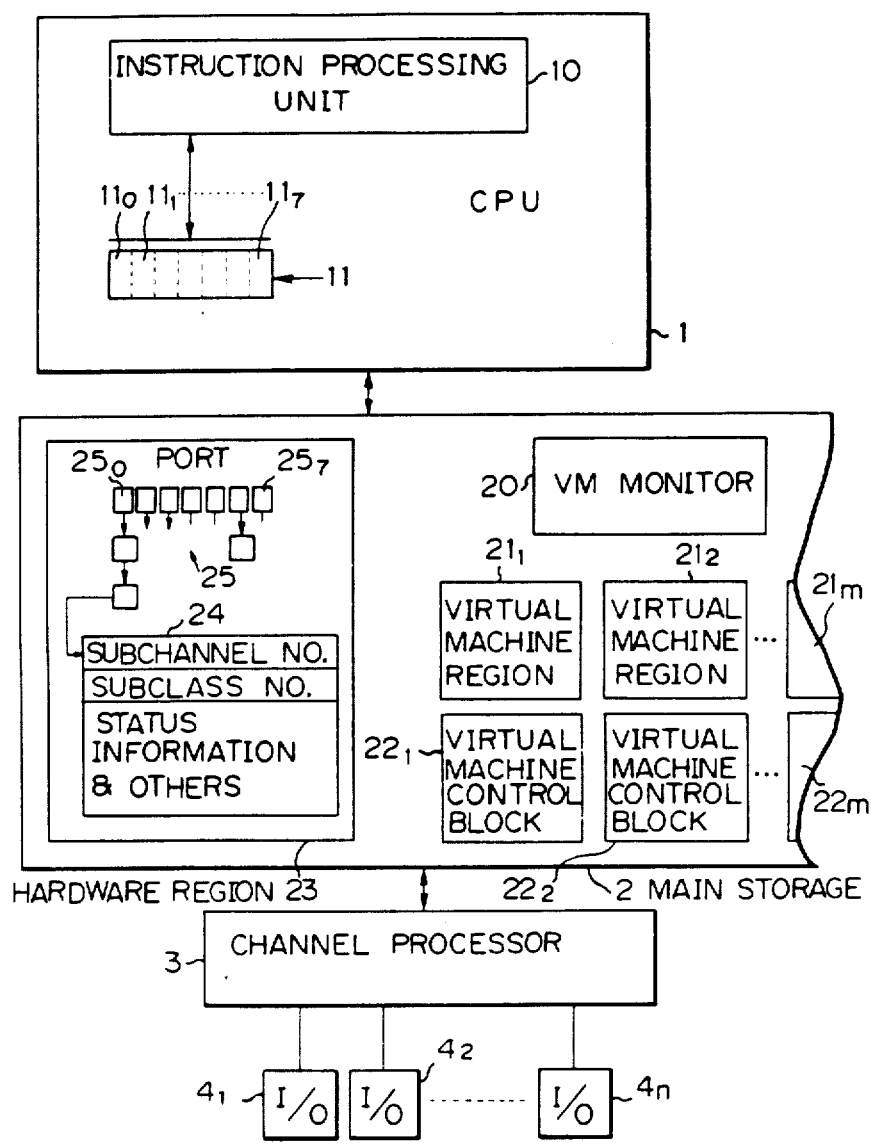
FIG. 1 is a block diagram showing an example of a prior art virtual machine system.

FIG. 1 is a view showing an example of a prior art virtual machine system. In the FIG. 1, the numeral 1 represents a central processing unit (CPU); 2, a main storage; 3, a channel processor; and $4_1$ to $4_n$, I/O devices. The CPU 1 comprises an instruction processing unit 10 and an I/O interrupt mask register 11, etc. The mask register 11 determines whether the CPU 1 should enable or disable an I/O interrupt request from an I/O interruption queue 25 (described later) loaded by the channel processor 3. For example, the mask register 11 comprises eight mask bits $11_0$ to $11_7$. Each mask bit indicates the I/O interrupt enable state when logic "1" is set. The mask bits $11_0$ to $11_7$ correspond to subclass numbers 0 to 7 respectively, which indicate the interrupt priority. When the control right of the CPU is transferred to a virtual machine, the content of the mask register 11 becomes interrupt mask information for the VM monitor and is operated generally in an all "1" state. On the other hand, each virtual machine has a virtual mask register and these registers are, as will be described later, provided, for example, in each of the virtual machine control blocks $22_1$ to $22_m$.

The channel processor 3 comprising an I/O channel accomodates a plurality of I/O devices $4_1$ to $4_n$. The I/O devices $4_1$ to $4_n$ are provided with specific subchannel number and subclass numbers respectively. Each subchannel number designates one of the subchannels, generally a plurality controlled by the channel processor 3. The channel processor 3 uses subchannel words 24 to hold control information, for every subchannel, for example, in a hardware region 23 provided in the main storage 2. The hardware region 23 is a storage region which cannot be accessed directly by the software. Each subchannel word 24 is a control block for storing the subchannel number, subchannel class, status information, and other control information.

The main storage 2 includes virtual machine regions $21_1$ to $21_m$ wherein each program of a plurality of virtual machines $VM_1$ to $VM_m$, realized by the real machine is stored, and virtual machine control blocks $22_1$ to $22_m$, wherein control data for each virtual machine is stored. The virtual machine control blocks $22_1$ to $22_m$ incorporate virtual I/O interrupt mask registers of the virtual machines corresponding to the I/O interrupt mask register 11 of the CPU. The main storage 2 incorporates the above-mentioned VM monitor 20. Further, the main storage 2 has a hardware region 23 wherein the subchannel words 24 and the I/O interrupt queue 25 are provided.

The I/O interrupt queue 25 comprises ports $25_0$ to $25_7$ each corresponding to the mask bits $11_0$ to $11_7$ of the mask register 11 respectively and provided for each subclass. Each of the ports $25_0$ to $25_7$ may have a plurality of queue elements for carrying out an I/O interrupt queuing. When a plurality of interrupts are generated in the same subclass, the interrupt generated later is placed behind the preceding queue element. Interrupt requests for the CPU 1 are carried out by reading out the contents of the queue elements successively for every subclass, in the order of priority, whenever the interrupt is handled. Therefore, in the same subclass, the later the interrupt, the later it is handled. Each queue element has a pointer which indicates a corresponding subchannel word. With this pointer, a subchannel word, related to the I/O device which has caused the I/O device interrupt, is supplied to the CPU 1, whereby the I/O interrupt handling can be carried out.

Figure 2B:
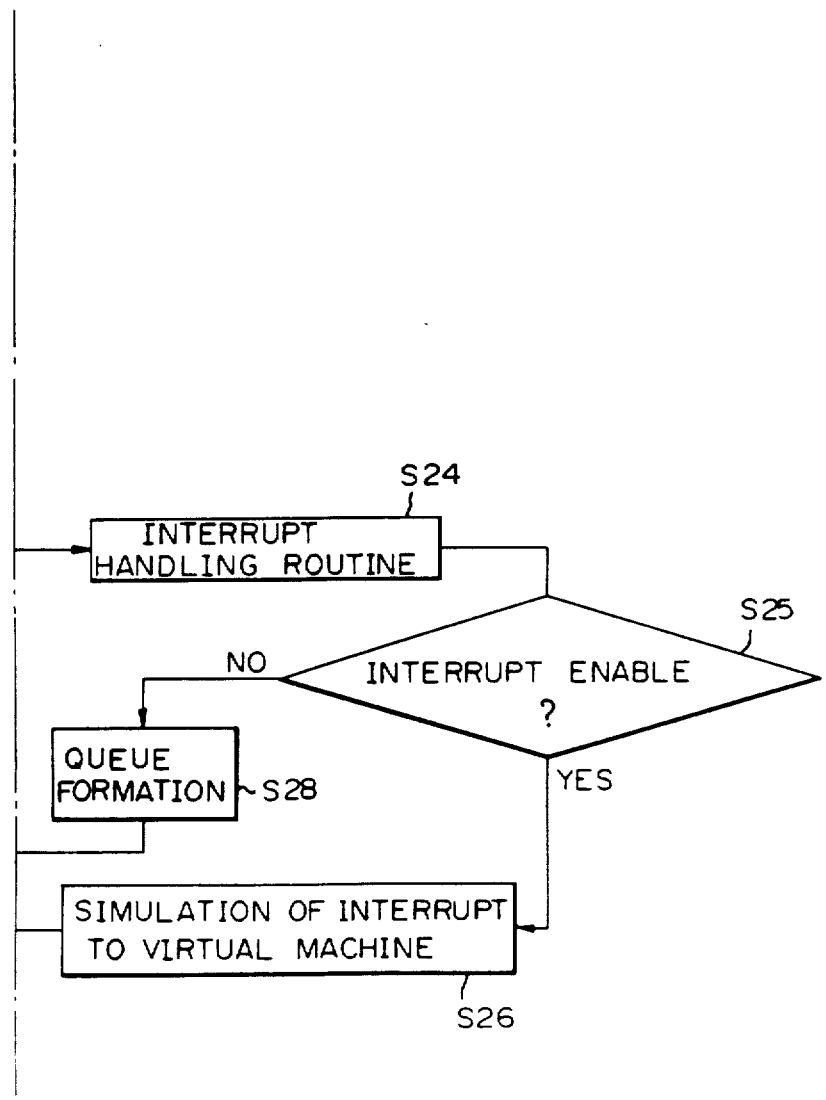

The handling of the I/O interrupt by the system shown in FIG. 1 will be described below with reference to FIGS. 2A and 2B. FIGS. 2A and 2B comprise a flowchart showing an I/O interrupt handling sequence carried out by the system shown in FIG. 1. First, an I/O start for the I/O device caused by an I/O instruction of a virtual machine will be described.

The CPU 1 executes a program of the VM monitor 20 in the main storage 2 to transfer the control right of the CPU to one of the programs of the virtual machine regions $21_1$ to $21_m$ allocated for each virtual machine, so that one virtual machine may be operated. When an I/O instruction is encountered during the operation of the virtual machine, as is well known, the CPU transfers the control right to the VM monitor 20. Then, the VM monitor 20 executes an I/O instruction for the real machine to simulate the virtual I/O instruction, so that an I/O start takes place in the channel processor 3, to start an I/O operation.

As is known, the I/O start caused by the I/O instruction is carried out, includes designating one of the subchannels, and is controlled by the channel processor 3. At the same time, a subclass to which the I/O device belongs is designated. The channel processor 3 stores the subchannel number and necessary control information in a subchannel word 24 of the subchannel designated upon the I/O start, then starts the control of the I/O operation.

When the I/O operations is completed by the I/O device, a state requiring a I/O interrupt request exists. Then, the channel processor 3 stores the given status information, etc., into the subchannel word 24 of the designated subchannel, and according to the subclass number stored in that subchannel word 24, places a queue element indicating the interrupt demand in a port of the I/O interruption queue 25, which corresponds to the subclass number.

On the other hand, as shown in the flowchart of FIG. 2A, the hardware or microprogram of the instruction processing unit 10 of the CPU 1 checks the contents of the mask bits $11_0$ to $11_7$ of the mask register 11 in the order of priority after completion of each macro instruction (step S20). When the content of the mask bit indicates an interrupt enabled state, i.e., "1", a port of the I/O interruption queue 25, which corresponds to the mask bit in question, is checked (step S21), and if an interrupt request is in that port, an I/O interrupt for the VM monitor of the real machine will be generated (step S22).

On the other hand, when the mask bit of the mask register 11 is in an interrupt disabled state, or when no interrupt request exists in the port of the queue 25 although the mask bit of the mask register 11 is in the interrupt enabled state, the next subclass is checked in the same way (steps S20 to S23). In this way, all the subclasses are checked, and if it is judged finally that no conditions exist to necessitate the generation of the interrupt, the next instruction will be executed.

When the I/O interrupt for the VM monitor of the real machine takes place in step S22, the control right of the CPU is transferred in an ordinary way from the execution routine of the virtual machine to the VM monitor 20 of the real machine to execute an I/O interrupt handling routine in the VM monitor 20 (step S24). See FIG. 2B. By this handling routine the interrupt information is analyzed. For example, it is determined which virtual machine has issued the I/O instruction which caused the I/O interrupt, i.e., for which virtual machine the interrupt request has been generated, or whether or not the mask bit of the virtual mask register in the virtual machine control block 22 of the virtual machine, which has issued the I/O instruction, is in an interrupt enabled state, etc.

As a result of the analysis, when the virtual mask register in question is judged to be in an interrupt enabled state (step S25), the generation of an I/O interrupt for the virtual machine in question is simulated in the following sequence:

(1) The current program status word (PSW) of virtual machine is saved in virtual machine region 21;

(2) Status information is stored as interrupt information; and (3) A new PSW of the virtual machine is loaded.

After that, the control right of the CPU is transferred to the virtual machine to operate the virtual machine, whereby an I/O interrupt handling routine of the virtual machine is started.

On the other hand, when the mask bit of the virtual mask register is judged to be in the disabled state in step S25, the interrupt information is allocated to the I/O interrupt request queue in the virtual machine control block (step S28), whereby the interrupt is held until the mask bit assumes the enabled state, and during that period, the following instruction of the previous virtual machine is executed.

Subsequently, when an instruction for changing a mask bit by the virtual machine is executed, the CPU transfers the control right of the CPU to the VM monitor 20. When the mask bit assumes the enabled state, the VM monitor 20 must take the interrupt information out of the above-mentioned queue to simulate the I/O interrupt.

As described above, when I/O interrupt handling is carried out by the system shown in FIG. 1, the VM monitor interposes at the I/O interrupt to handle the interrupt, therefore the problem arises wherein the time needed for controlling the virtual machine system may be increased.

A preferred embodiment of the present invention will now be explained with reference to FIGS. 3 and 4.

Figure 3:
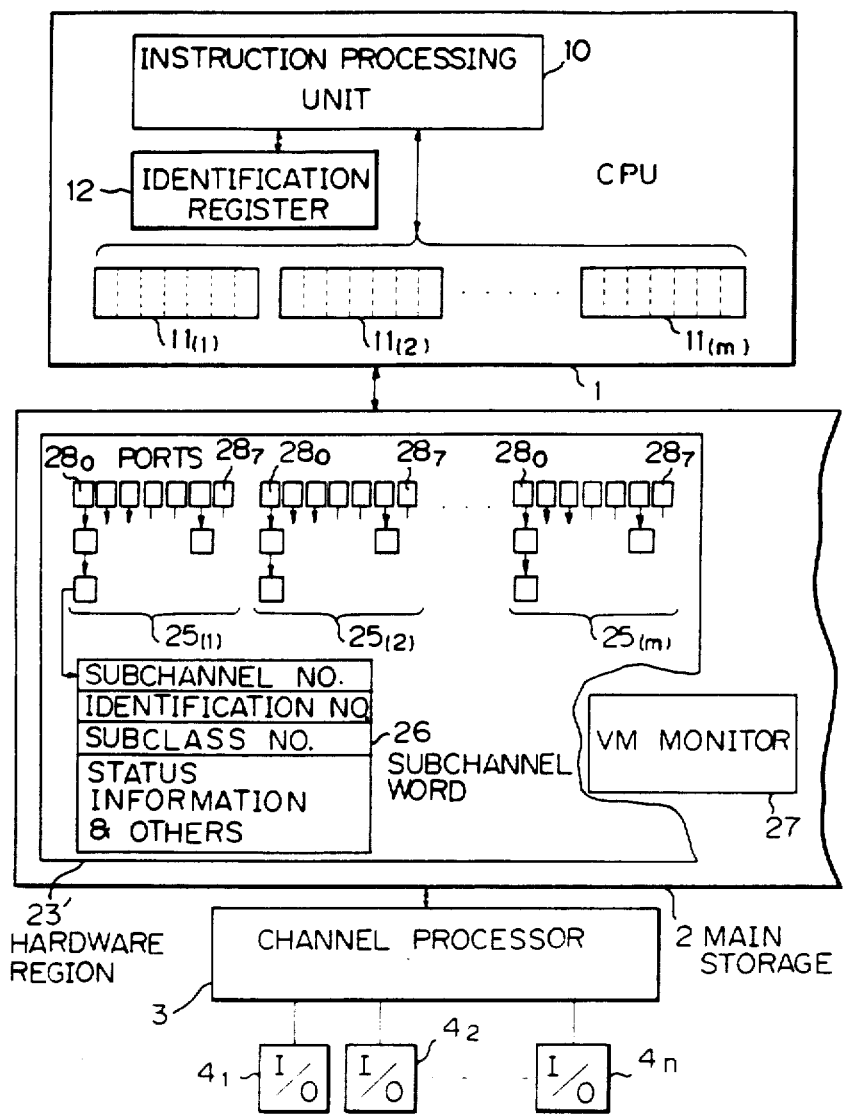
FIG. 3 is a block diagram showing an embodiment of a virtual machine system according to the present invention.

FIG. 3 is a block diagram showing a virtual machine system according to the present invention. The differences between the virtual machine system shown in FIG. 3, and that shown in FIG. 1 will be described hereunder. In FIG. 3, a central processing unit (CPU) 1 has mask registers 11(1) to 11(m), each having the same function as that of the mask register shown in FIG. 1, having numbers corresponding to the numbers of the virtual machines $VM_1$ to $VM_m$. The mask registers 11(1) to 11(m) are allocated for the virtual machines $VM_m$ to $VM_m$ respectively. Further, each of the virtual machines $VM_1$ to $VM_m$ is given an identification number respectively, and an identification register 12 for holding the identification number of a currently operating virtual machine is provided. This identification register 12 stores or changes the identification number under the control of a VM monitor 27. A mask register, corresponding to a virtual machine designated by the identification number stored in the identification register 12, is selected from the mask registers 11(1) to 11(m) to assume an operable state, while the remaining mask registers assume a standby state.

A hardware region 28 in a main storage 2 is provided with a group of I/O interruption queues 25(1) to 25(m) corresponding to the mask registers 11(1) to 11(m) of the CPU 1 respectively. Each of the queues 25(1) to 25(m) has the same function as that of the queue 25 described with reference to FIG. 1. A subchannel word 26 is provided with regions for storing the identification number of a virtual machine in addition to the subchannel number, the subclass number, and the status information.

Figure 4:
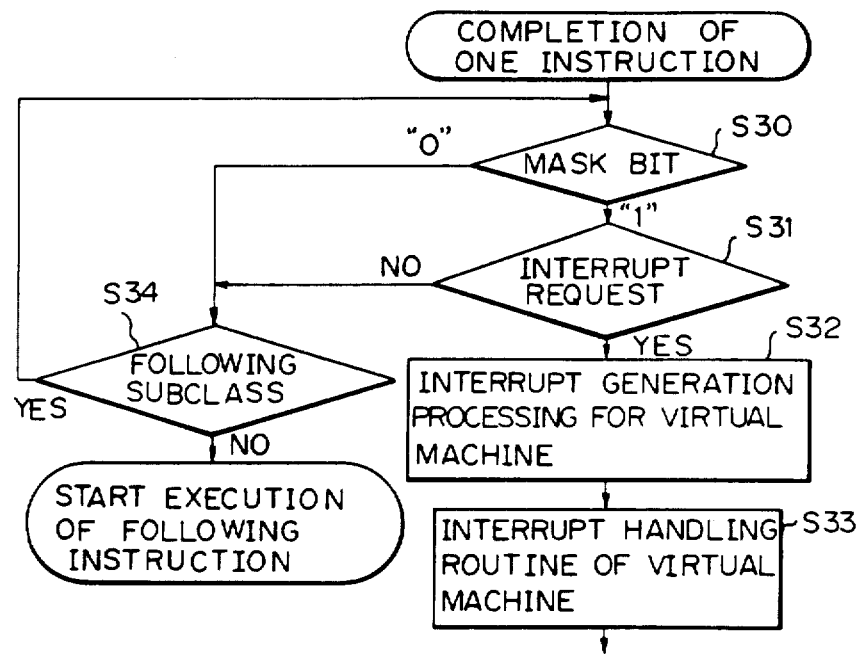
FIG. 4 is a flowchart showing an interrupt handling sequence executed in the system shown in FIG. 3.

The operation of the system shown in FIG. 3 will be described with reference to FIG. 4, showing an I/O interrupt handling sequence carried out by the system showin in FIG. 3.

The VM monitor 27 operates in the same manner as that of the prior art system, for example, to control the virtual machines and to decide which virtual machine will receive the control right of the CPU. The VM monitor 27 assigns the identification numbers for the virtual machines $VM_1$ to $VM_m$ respectively. However, when the control right of the CPU is transferred to any one of the virtual machines, the VM monitor 27 loads the identification number of the virtual machine into the identification register 12.

When an I/O start caused by an I/O instruction of the virtual machine takes place, a channel processor 3 receives a subchannel designation and a subclass designation from the CPU 1 as in the case of the prior art. However, at the same time, the channel processor 3 also receives the identification number stored in the identification register 12, and then stores that identification number together with the subclass number, etc., into the subchannel word 26.

When an I/O operation at the I/O device is completed and a state requiring an I/O interrupt request exists, predetermined status information, etc., is stored in the subchannel word 26, then the queue corresponding to the identification number of the virtual machine stored in the subchannel word 26 is selected from the queues 25(1) to 25(m). Further, in that selected queue, one of the ports $28_0$ to $28_7$ provided for each subclass is selected according to the subclass number stored in the subchannel word 26 to allocate a queue element indicating the interrupt request to the selected port. Thus, the interrupt request assumes an interrupt waiting state.

A hardware or a micro program of an instruction processing unit 10 of the CPU 1 selects, as shown in FIG. 4, at the time of completion of one macro instruction, the mask register designated by the control register 12 from the mask registers 11(1) to 11(m), then checks the mask bits of the selected mask register to judge whether the interrupt is enabled or disabled (step S30).

When the mask bit is in the interrupt enabled state, i.e., when the mask bit is "1", a port corresponding to the mask bit in the queue is checked to judge whether or not an interrupt request exists (step S31). When the I/O interrupt request exists, a process is carried out for interrupting directly the currently operating virtual machine designated by the identification register 12 (step S32), and thereby an interrupt handling routine of the virtual machine is started (step S33). The interrupt generating process (step S32) is similar to that described with reference to FIG. 2. For example, the process includes a save of the current PSW, a store of staus information as interrupt information, and a loading of the new PSW, etc.

When it is judged that there are no interrupt requests (step S31), as described in FIG. 1, it is judged whether or not a subclass having a lower priority exists (step S34). When another subclass exists, steps S30 and S31 are repeated, whereby all the subclasses of the subchannel are checked in relation to whether the interrupt is enabled or disabled and whether or not the interrupt request exists.

As mentioned above, the virtual machine system shown in FIG. 3 does not require the interposition of the VM monitor to simulate an I/O interrupt when the I/O interrupt of the virtual machine is carried out, so that the overhead for controlling the virtual machine system is reduced, whereby the processing power of the virtual machine system is improved.

Although a preferred embodiment has been described heretofore, various modifications and alterations are possible within the scope of the present invention.

We claim:

1. A computer system for controlling a number of virtual machines each having a different identification number, comprising:
   a central processing unit, including an instruction processing unit connected to an identification memory and to mask memories;
   a channel processor connected to said central processing unit;
   one or more input/output (I/O) devices connected to said channel processor, the mask memories in said central processing unit being equal in number to the virtual machines and including bits, each of the bits indicating an enabled interrupt classification, each of the mask memories corresponding to one of the different identification numbers; and I/O interruption queues, connected to and accessible by said central processing unit and said channel processor, equal in number to the virtual machines, each corresponding to one of the different identification numbers, the identification memory in said central processing unit storing the identification number of a currently operating virtual machine, said central processing unit carrying out an I/O start for starting an I/O operation in one of the I/O devices by establishing a correspondence between the identification number of the currently operating virtual machine and the one of the I/O devices, said channel processor storing an I/O interrupt request from one of the I/O devices into one of said I/O interruption queues in dependence upon the identification number corresponding to the one of the I/O devices when the I/O operation is terminated, regardless of the identification number of the currently operating virtual machine, and said central processing unit accessing one of the mask memories in dependence upon the identification number stored in the identification memory and said central processing unit determining whether or not the interrupt of the one of the I/O devices is enabled as indicated by the bits in the accessed one of the mask memories.

2. A computer system for controlling virtual machines according to claim 1, said system further comprising subchannel word storage means connected to said central processing unit and said channel processor, for storing the identification number of the currently operating virtual machine when the I/O start for the one of the I/O devices is carried out by said central processing unit, said channel processor storing the I/O interrupt request from the one of the I/O devices into the one of the I/O interruption queues corresponding to the identification number stored in said subchannel word storage means, when the I/O operation is terminated.

3. A computer system for controlling virtual machines according to claim 1, wherein the mask memories and the identification memory comprise registers connected to the instruction processing unit.

4. A computer system for controlling virtual machines according to claim 2, wherein the subchannel word storage means comprises a register connected to said central processing unit and said channel processor.

5. A computer system for controlling virtual machines according to claim 1, wherein the I/O interruption queues each comprises a plurality of queue elements connected together and connected to said central processing unit and said channel processor.

6. A computer system for controlling virtual machines according to claim 1, wherein said central processing unit executes a virtual machine control program for controlling operation of the virtual machines.

* * * * *